April 8, 1924. 1,489,781
F. G. MOUSE
WINDSHIELD
Filed Nov. 16, 1922 2 Sheets-Sheet 1
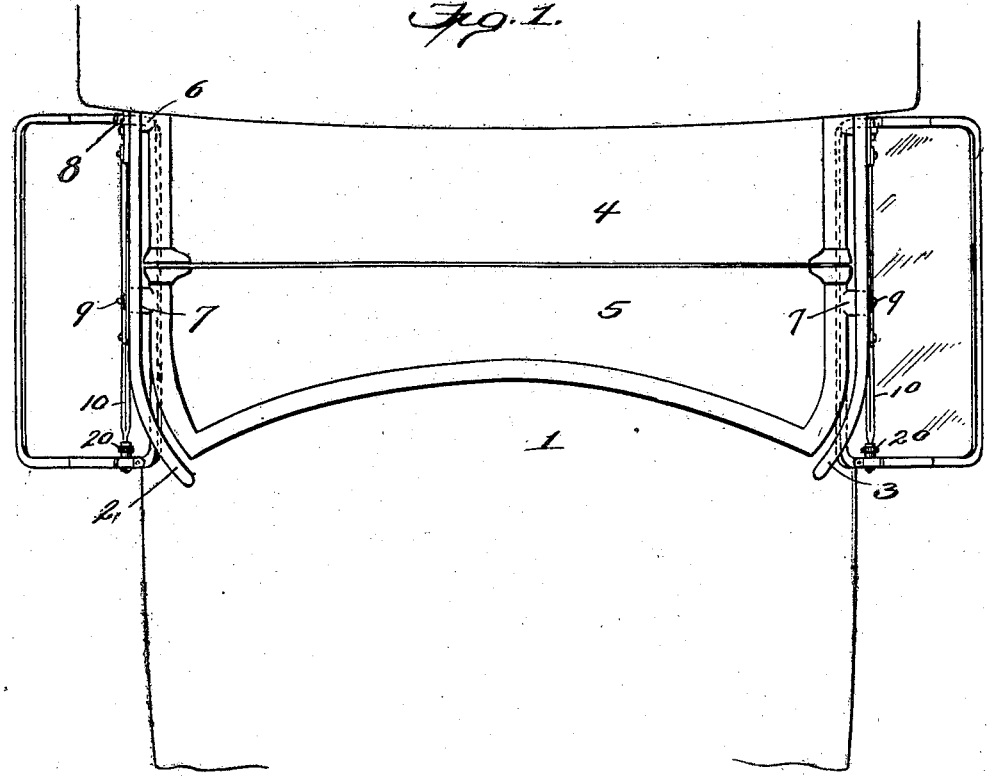
Fig. 1.
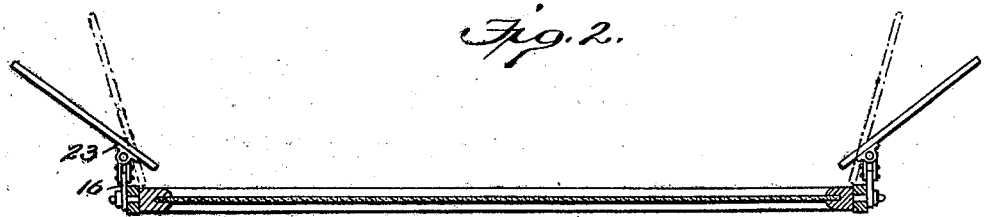
Fig. 2.
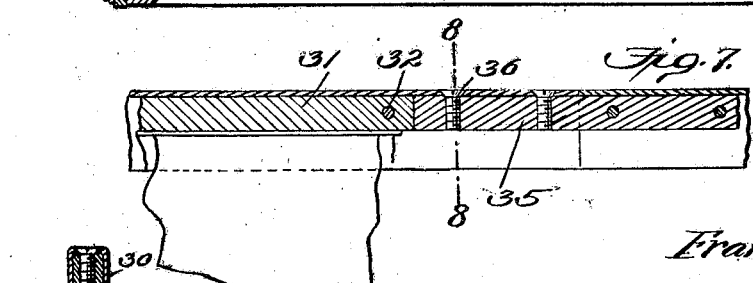
Inventor
Frank G. Mouse
By
Attorney

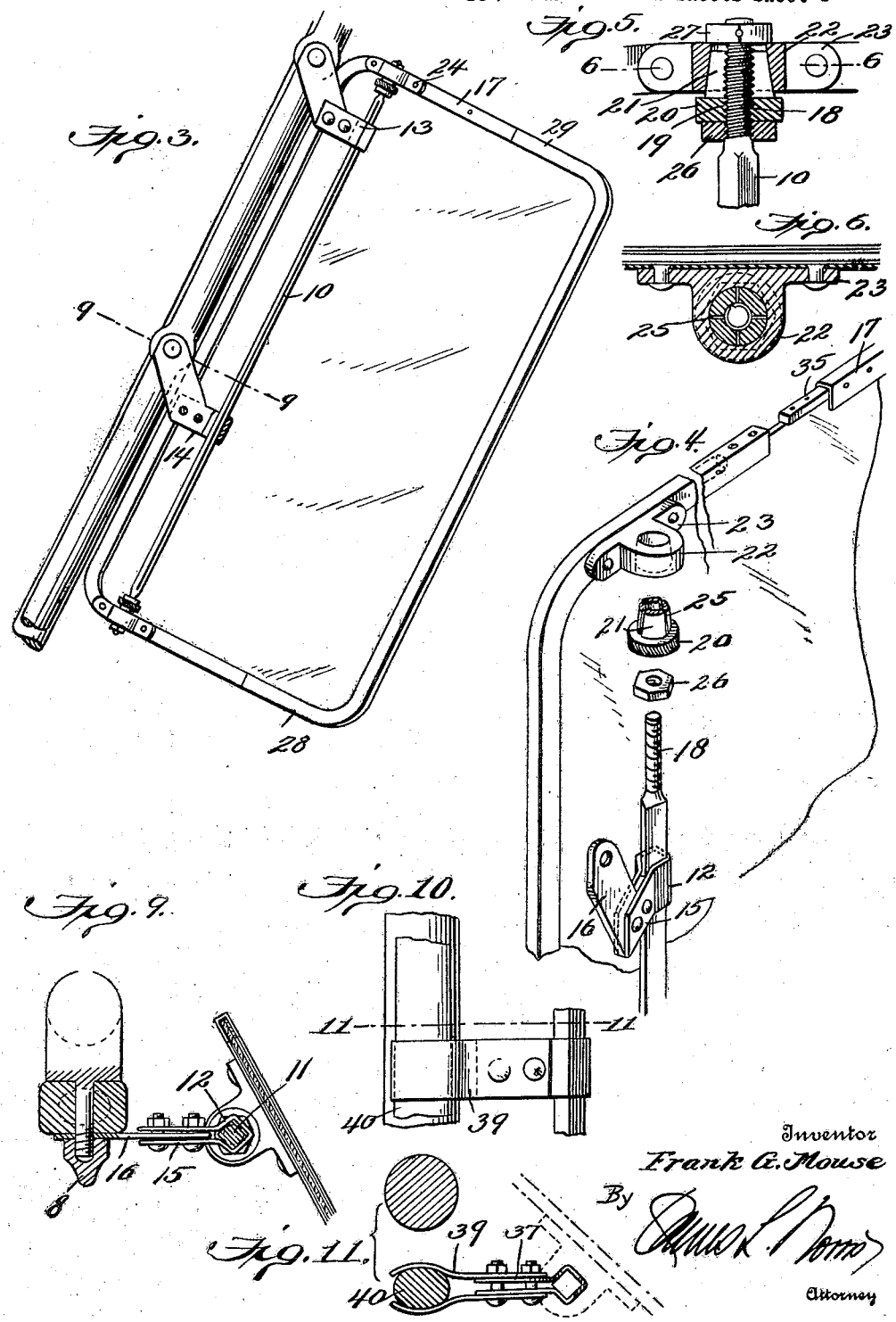

Patented Apr. 8, 1924.

1,489,781

UNITED STATES PATENT OFFICE.

FRANK GARRISON MOUSE, OF LUDLOW FALLS, OHIO.

WINDSHIELD.

Application filed November 16, 1922. Serial No. 601,336.

*To all whom it may concern:*

Be it known that FRANK G. MOUSE, a citizen of the United States, residing at Ludlow Falls, in the county of Miami and State of Ohio, has invented new and useful Improvements in Windshields, of which the following is a specification.

This invention relates to windshields for auto vehicles and proposes the construction of a novel wind deflector for use primarily in conjunction with the regular windshield but which, with slight changes in the shape of the securing means such as are well within the spirit of the invention, may be adapted to arrangement adjacent the back seat of the auto vehicle or used on vehicles generally.

One of the objects of the invention is the provision of a wind deflector adapted to be attached to the supporting post of a windshield and to be frictionally securable in various positions of adjustment.

Another object of the invention is to provide an attaching rod of polygonal cross section, secured to a windshield supporting post by clamping means of similar shape, and a frame enclosing a glass or other transparent element and connected to the attaching bar by adjustable frictional joints.

Still another object of the invention is the construction of the enclosing frame in separable parts to permit the easy insertion thereinto of a replacement glass.

A further object of the invention resides in the constructional principles of the friction joint between the attaching rod and frame.

With the above and other objects in view, my invention consists in the improved windshield illustrated in the accompanying drawings, described in the following specification, and particularly claimed, and in such variations and modifications thereof as will be obvious to those skilled in the art to which my invention relates.

In the drawings accompanying and forming a part of this specification and wherein the preferred embodiment of my invention is illustrated:

Figure 1 is a front elevation of the windshield of an auto vehicle showing one of my improved wind deflectors at each side.

Figure 2 is a plan view of the same.

Figure 3 is a perspective view of the wind-deflector.

Figure 4 is an exploded view showing details of the friction joint and the separable frame.

Figure 5 is an elevation partly in cross section of the friction joint.

Figure 6 is a cross section taken along the line 6—6 of Figure 5.

Figure 7 is a detail view partly in section showing one of the joints of the divided frame.

Figure 8 is a cross sectional view taken along the line 8—8 of Figure 7.

Figure 9 is a section taken along the line 9—9 of Figure 3 showing the construction of one of the clamps.

Figure 10 is a side elevation showing an alternative form of clamp to that shown in Figure 9.

Figure 11 is a section taken along the line 11—11 of Figure 10.

Referring now in detail to the several figures, the numeral 1 represents the forward portion of the body of an auto vehicle having the stationary windshield posts 2 and 3 arising from opposite sides thereof to each of which the upper and lower panels 4 and 5 are secured by means of swivel joints 6 and 7 respectively, of which the nuts 8 and 9 form an element. These nuts may be made use of as securing means for the wind deflector of my invention.

Said wind deflector comprises an attaching rod 10 which is preferably arranged in parallelism with the upright portion of the windshield post, said rod being preferably polygonal in shape throughout its intermediate portion as shown at 11 in Figure 9 and engageable within the resilient clamping means 13. These clamping means are, in the form of the invention illustrated, two in number. Each comprises a resilient loop 12 of polygonal form, the arms 15 of which are bolted to a stationary bracket 16, the latter having an aperture in its outer end which is secured beneath one of the nuts 8 or 9. The act of bolting the loop to the stationary bracket contracts the polygonal portion thereof causing it to firmly engage the faces of the attaching rod 10. It is of course obvious that the clamps could be made with round loops and the rod 10 be of cylindrical shape, but since, as will hereinafter appear, there is considerable torsional stress exerted upon the rod 10 when the deflector is adjusted from one angular position to another, it is the preferred form of the invention to provide a positive non-rotatable connection between the clamps and the attaching rod.

A frame 17 is journally supported along an axis intermediate its width upon the attaching rod, the ends of the latter being rounded and threaded as shown at 18 in Figure 5 to receive a frictional bearing 19 by which said frame is carried. This bearing consists of a knurled portion 20 and a conical part 21, the latter fitting into a tapered socket 22 carried by the plate 23 which is secured to the frame in any desirable manner as by the rivets 24. The interior bore of the bearing 19 is threaded and the conical portion thereof is slotted as shown at 25 in Figures 4 and 6 so that when the bearing is crowded into the socket 22 by rotating it along the threaded end of the attaching rod the split portions of said bearing will be crowded into said threaded end preventing relative rotation between the bearing and the attaching rod. A lock nut 26 is threaded upon the rod 10 and by engaging the bearing 19 assists in the prevention of relative rotation between said parts. On the outer end of the rod 10 is secured a collar 27 which bears against the plate 23 and forms an abutment to resist the tendency of the rod 18 to withdraw itself from the socket 22 when the bearing is tightened. The surface between the conical portion 21 of the bearing and the tapered wall of the socket 22 form a frictional joint which permits the frame 17 to be moved for positional adjustment when considerable pressure is applied thereto but sufficiently stiff to prevent alteration in the angular position of said frame through incidental forces such as vibration of the vehicle, or wind pressure. The construction of the frictional joint is such that it may be properly adjusted at the factory to give the requisite coefficient of friction and may be assembled without necessarily altering said adjustment. If, however, through long wear or for other causes the joint should become too loose or too tight to function properly it is a simple matter to obtain any desired degree of friction by backing off the lock nut 26 and advancing or retracting the bearing 19 by manipulation of the knurled portion 20.

The invention contemplates the construction of a wind deflector in which the transparent member, which may be glass, is so supported as to be free from stress which might result in its breakage. For instance there are no holes bored in the glass for engagement with the supporting means as is the case with a number of known wind deflectors. Nor is the weight of the glass carried at a single point or a few points of the latter, nor is the edge of the glass left bare to be chipped or broken by slight blows. On the other hand the glass is inserted in the frame 17 and is supported and protected upon all sides. On this account it is not necessary, although perfectly permissible, to use heavy plate glass such as is the usual custom but the glass used may be made considerably thinner, for instance double-thick window glass, and the replacement thereof due to actual breakage, thereby cheapened. In order to permit the ready removal of a broken glass or other transparent element 33 and the insertion of a new one the frame is made divisible at opposite points as shown at 27 in Figures 3 and 7, the frame being thus separable into two parts having parallel sides 28 and 29. The frame is preferably constructed from sheet material of heavy gauge which is stamped out in channel form as shown at 30 in Figure 8 and is reinforced by a wire or rod 31 the latter being bent around within the channel 30 and riveted to the sides thereof at a number of points 32. This rod or wire may be of any shape but is here shown as square and should be of sufficient width to fill the channel 30, the latter being wide enough to leave room for the glass or transparent element 33 with a rubber or other elastic strip 34 folded about the edge thereof as shown in Figure 8. The wire or rod 31 is made in two parts and the abutting ends thereof terminate at points adjacent to but not coincident with the lines of division 27 between the parts of the frame 17 so that the end 35 of said rod or wire projects beyond the end of one part as shown in Figure 4 and extends within the channel formed in the adjacent end of the other part of said frame. An interlocking construction is thus provided and the two parts of the frame held securely in place by screws 36 which are passed through the frame and the projecting ends 35 of said rod or wire. The exterior surfaces of the abutting ends of the frame parts are made flush, being free from evidences of the presence of any securing means.

As my improved wind deflector is intended for universal installation upon any type of auto vehicle it may happen that it is not practicable or convenient to utilize one of the nuts 8 or 9 as the securing means for said deflector, for which reason I have provided an alternate form of clamp, which is shown in Figures 10 and 11, and will prove a thoroughly efficacious means for the attachment of the deflector. This clamp comprises a resilient loop 37 which is similar in every respect to the loop 12 in the preferred form of clamp previously described, and bolted to a pair of clamping plates 39 which take the place of the bracket 16, the outer ends of said clamping plates being bent into a concave form as shown at 40 to adapt them to surround the upright part of the windshield supporting post at any point. It is of course understood that should said supporting post be of a different shape from that here shown the ends of the clamping plates 39 would be shaped accordingly.

While I have above described what I have found to be a very practical embodiment of my invention, it is nevertheless to be understood that the wind deflector may be exemplified in numerous other alternative constructions and I accordingly reserve the right of adopting all such legitimate changes as may be fairly embodied within the spirit and scope of the invention as claimed.

Having described my invention what I claim as new and desire to secure by Letters Patent, is:—

1. A wind deflector comprising an attaching rod, a frame adapted to embrace a transparent element and friction bearings for journally supporting said frame upon said attaching rod comprising conical male and female bearing members, said male member including a conical portion threadedly engaging the end of said attaching rod and being thereby adjustable with respect to said female member.

2. A wind deflector comprising an attaching rod threaded at its opposite ends, a frame adapted to embrace a transparent element, friction bearings for journally supporting said frame upon said attaching rod comprising aligned conical female members carried by said frame and male members each having a split conical portion threadedly engaging the end of said attaching rod and being thereby adjustable with respect to the adjacent female member.

3. A wind deflector comprising an attaching rod having threaded ends, a frame adapted to embrace a transparent element, friction bearings for journally supporting said frame with respect to said attaching rod at points intermediate the sides of said frame, said bearings including conical female members carried by said frame and male members threadedly engaging the ends of said attaching rod, each male member comprising a split conical portion cooperating with the adjacent female member and having a knurled finger hold and a lock nut associated therewith.

4. A wind deflector comprising an attaching rod, a frame adapted to embrace a transparent element, friction bearings for journally supporting said frame upon said attaching rod comprising aligned conical female members secured to opposite sides of said frame and conical male members adjustably secured to the ends of said attaching rod engageable with said female members on one side thereof, and end thrust friction bearings engageable with the opposite sides of said female members and fixed to said attaching rod.

5. A wind deflector comprising a frame formed of a channel bar divided at opposite sides forming separable parts, a reinforcing element seated within said channel and likewise divided at points non-coincident with the line of division of said channel bar, forming a projection from one end of said channel bar and leaving a recess in the other end in which said projection telescopes, and means engaging said telescoping portions for securing the parts of said channel bar together for securing said telescoping parts together.

In testimony whereof I affix my signature.

FRANK GARRISON MOUSE.

Witnesses:
H. M. McCallister,
Kenneth Little.